(12) United States Patent
Hilla et al.

(10) Patent No.: US 7,155,722 B1
(45) Date of Patent: Dec. 26, 2006

(54) SYSTEM AND METHOD FOR PROCESS LOAD BALANCING IN A MULTI-PROCESSOR ENVIRONMENT

(75) Inventors: Stephen C. Hilla, Raleigh, NC (US); Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 809 days.

(21) Appl. No.: 09/902,420

(22) Filed: Jul. 10, 2001

(51) Int. Cl.
*G06F 9/46* (2006.01)
*G06F 13/28* (2006.01)
*G06F 15/16* (2006.01)
*G06F 15/173* (2006.01)

(52) U.S. Cl. .......................... 718/105; 710/22; 710/28; 711/100; 711/147; 709/223; 709/227; 709/229

(58) Field of Classification Search ........ 718/100–108; 709/200, 203–229; 707/10; 711/170, 146, 711/158, 100, 147; 370/392; 710/100, 200, 710/22–28

See application file for complete search history.

(56) References Cited

U.S. PATENT DOCUMENTS

| | | | |
|---|---|---|---|
| 5,261,106 A * | 11/1993 | Lentz et al. ................ 710/200 |
| 5,269,013 A * | 12/1993 | Abramson et al. .......... 711/170 |
| 5,572,701 A * | 11/1996 | Ishida et al. ................ 711/146 |
| 5,701,482 A * | 12/1997 | Harrison et al. ............ 718/105 |
| 5,913,043 A * | 6/1999 | Carter et al. ................ 710/100 |
| 6,067,545 A * | 5/2000 | Wolff .......................... 707/10 |
| 6,085,218 A * | 7/2000 | Carmon ...................... 718/107 |
| 6,101,508 A * | 8/2000 | Wolff .......................... 709/223 |
| 6,101,599 A | 8/2000 | Wright et al. |
| 6,173,386 B1 | 1/2001 | Key et al. |
| 6,185,601 B1 * | 2/2001 | Wolff .......................... 709/203 |
| 6,272,621 B1 | 8/2001 | Key et al. |
| 6,317,792 B1 * | 11/2001 | Mundy et al. .............. 709/227 |
| 6,330,645 B1 | 12/2001 | Harriman |
| 6,330,647 B1 * | 12/2001 | Jeddeloh et al. ............ 711/158 |
| 6,442,669 B1 | 8/2002 | Wright et al. |
| 6,449,576 B1 * | 9/2002 | Bass et al. .................. 702/117 |
| 6,484,224 B1 | 11/2002 | Robins et al. |
| 6,505,269 B1 | 1/2003 | Potter |
| 6,513,108 B1 | 1/2003 | Kerr et al. |
| 6,549,934 B1 * | 4/2003 | Peterson et al. ............ 709/203 |
| 6,738,813 B1 * | 5/2004 | Reichman .................... 709/224 |
| 6,779,017 B1 * | 8/2004 | Lamberton et al. ......... 709/203 |
| 6,779,034 B1 * | 8/2004 | Mundy et al. .............. 709/227 |
| 6,798,777 B1 * | 9/2004 | Ferguson et al. ........... 370/392 |
| 6,886,035 B1 * | 4/2005 | Wolff .......................... 709/219 |
| 2002/0049803 A1 * | 4/2002 | Bandhole et al. ........... 709/104 |
| 2002/0060988 A1 * | 5/2002 | Shtivelman ................. 370/259 |
| 2002/0073211 A1 * | 6/2002 | Lin et al. .................... 709/229 |
| 2002/0078187 A1 * | 6/2002 | Rawson, III ................ 709/222 |

\* cited by examiner

*Primary Examiner*—Thomas Lee
*Assistant Examiner*—Jennifer N. To
(74) *Attorney, Agent, or Firm*—Cesari and McKenna LLP

(57) ABSTRACT

A load balancing mechanism and technique that monitors a memory interface associated with a processor resource in a processor pool associated with at least one node of a computer network. The monitoring determines the actual load activity executed by the processor during a specified period of time. The mechanism comprises a hardware access monitor configured to determine the true activity of each processor resource. The access monitor tracks certain memory requests over the memory interface and stores the requests in a counter assigned to each processor. The access monitor then collects statistics from each processor resource of the pool and provides those statistics to a central load balancing resource for use when determining assignment of loads (tasks) to the various processor resources.

20 Claims, 3 Drawing Sheets

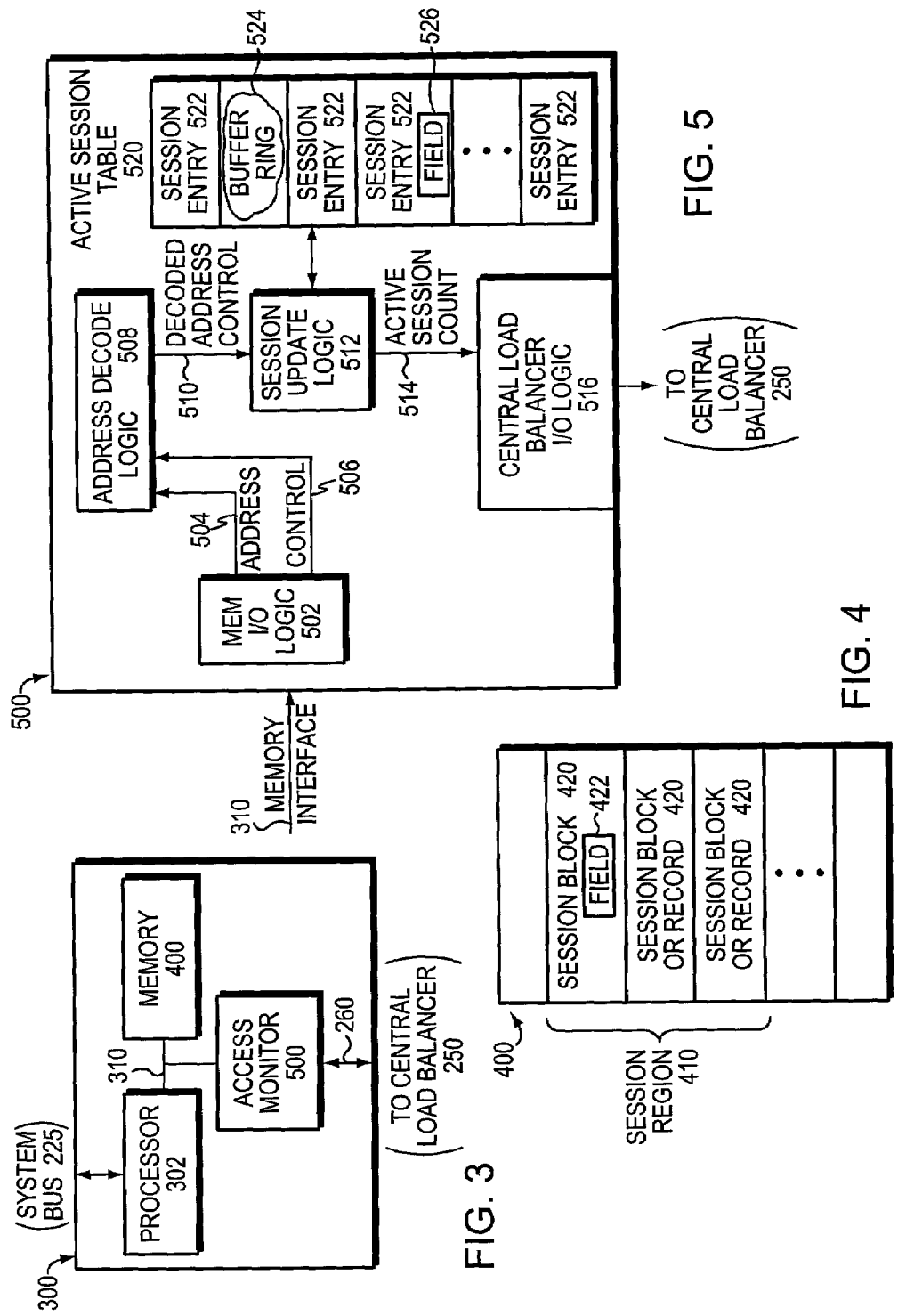

SYSTEM AND METHOD FOR PROCESS LOAD BALANCING IN A MULTI-PROCESSOR ENVIRONMENT

FIELD OF THE INVENTION

This invention relates generally to multiprocessor computer networks and, more specifically, to improving load balancing of an intermediate node of the computer network.

BACKGROUND OF THE INVENTION

A computer network is a geographically distributed collection of interconnected subnetworks for transporting data between nodes, such as computers. A local area network (LAN) is an example of such a sub-network; a plurality of LANs may be further interconnected by an intermediate network node, such as a router or switch, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

Each node typically comprises a number of basic components including a processor, a memory and an input/output (I/O) interface. To increase performance, a node (such as an intermediate network node) may embody a multiprocessor environment wherein a plurality ("pool") of processors is coupled to at least one I/O interface and to a central load balancer. Load balancing is an issue that must be addressed in order to enable the efficient use of the processors of the node. In addition, several objectives must be considered when determining the processing "load", i.e., the work or tasks, to be balanced across the multiple processors.

One objective is that each processor should be kept substantially equally "busy" to ensure that the entire workload is processed as quickly as possible. If there is sufficient work to be performed, distribution of tasks among the processors is straightforward, i.e., the work should be distributed evenly among the processors. In other words, roughly the same amount of processing tasks should be assigned to each processor. However, some tasks are relatively inactive compared to others, so the distribution of the tasks requires further planning. Furthermore, precedent constraints between different tasks (i.e., real time requirements, priorities—some tasks must be performed before others) must be considered when distributing the tasks among the processors to meet the objective. Data load traffic, such as packets, is transferred over the computer network, received at the I/O interface and forwarded to the processor pool for processing. The data traffic may comprise user information that, when received at the intermediate network node, is used to create a user session. Herein session, load and task are used interchangeably. An example of such a session may be a voice or packet "call" between two users over the computer network. Coupled to each I/O interface is a forwarding table containing information used to direct each user session to a particular processor of the pool.

The central load balancer updates the forwarding table information in response to creation of the user session. The updated information enables each interface associated with a node, upon receiving incoming data traffic associated with the session, to forward that traffic to the appropriate processor. The processor maintains, inter alia, state information pertaining to that created session. When new sessions are created in response to user data traffic received at the intermediate network node, the central load balancer is notified so that it may update a central database; the database then distributes information to each forwarding table associated with an I/O interface of the node.

An application particularly suited for this type of multiprocessor environment is a wireless networking application using, e.g., cellular phones to exchange information among users. For this type of application, the multiprocessor environment is configured to provide session processing operations for each user. Wireless networks perform functions similar to that of "wired" networks in that the atmosphere, rather than the wires, provides a path over which the data may flow. Of course, the atmosphere is shared by many users using techniques that facilitate the sharing. Examples of a shared wireless network include a wireless local area network (WLAN) and a wireless asynchronous transfer mode (WATM) network. An example of a wireless access technique is the IEEE 802.16 standard for broadband wireless access (BWA).

The central load balancer is typically a general-purpose processor that is configured to execute various load-balancing algorithms, such as known round robin or statistic based distribution algorithms. However, a problem with such algorithms is that they do not take into consideration the "states" of the sessions. That is, although the number of sessions may have been balanced across the processors according to the algorithm(s), some of the sessions may be active, some relatively inactive and some completely inactive. For example, even though each processor within the processor pool may be assigned the same number of sessions, one processor may have a majority of active sessions (i.e., sessions exchanging information), whereas another processor may have a majority of inactive or "quiescent" sessions (i.e., sessions with no exchange of information).

Thus equally distributing the sessions or tasks does not equally distribute the active work among the processor resources. To address this problem, the central load balancer may be configured to gather and monitor the states of the sessions assigned to each processor by utilizing a software-based pooling algorithm. However, this solution is expensive by consuming resources on behalf of the central load balancer and each processor of the processor pool. For example, the central load balancer may utilize resources of the node to store the sessions themselves and to constantly monitor the states of the sessions executing on the processors by, e.g., accessing information from memories associated with the processors. The sessions' state information, such as statistics indicating the activity associated with each session, would be routinely accessed by the central balancer.

Moreover, each processor consumes "overhead" when obtaining the statistics gathered by the central load balancer. For example, the processors may use counters to obtain statistics, such as the number of times a packet associated with a session is processed, the number of packets associated with the session and/or the size of the packets associated with the sessions. Such overhead further consumes resources of the intermediate network node that may otherwise be used to perform useful processing operations. In addition, when the central load balancer accesses the memories to acquire the statistical information, that information is usually retrieved "in-band," i.e., over the data path used to transport the packets throughout the node. Utilization of the in-band data path to transport statistics also consumes bandwidth associated with that resource.

In a typical wireless application, there may be a substantial number (e.g., hundreds of thousands) of sessions stored in the memories of the processor pool. Thus, it would be quite time consuming and expensive (in terms of resource consumption) for the central load balancer to access these memories to gather statistics used to determine the activity of the various sessions.

In summary memory storage space, memory (read, write, modify) cycles, data path capacity, and processor cycles are resources consumed by these known techniques directed towards load balancing in multiprocessor networks.

The present invention is directed to an efficient solution to this problem; in particular, the present invention provides a technique that efficiently monitors the active/inactive status of sessions distributed among the processors of a multiprocessor environment.

SUMMARY OF THE INVENTION

The present invention addresses the limitations of the prior art with a mechanism and technique for monitoring a memory interface associated with a processor resource of a processor pool in order to determine the actual activity executed by the processor during a specified period of time. The mechanism comprises an access monitor configured to determine the true activity of each processor resource by monitoring certain memory cycles associated with the processor. The number of such memory cycles, in a preferred embodiment, is stored in a counter assigned to the processor. The access monitor is arranged to compile statistics from each processor resource of the pool and provides those statistics to a central load balancing resource for use when determining assignment of loads (tasks) to the various processor resources.

The inventive mechanism is arranged to differentiate between active and inactive tasks assigned to each processor resource. For example, a processor may have been assigned thousands of tasks, as in the case with mobile wireless traffic patterns, but the tasks or sessions may be idle. In this case, the processor may not be processing any information and, accordingly, is available to perform additional processing operations. By monitoring certain memory cycles according to the inventive technique, the access monitor provides statistics to the central load balancer indicative of the actual measured activity of each processor resource. The central load balancer then only needs to keep track of the total number of sessions assigned to each processor resource to guard against reaching a predefined maximum load (task) limit. Then the load balancer may assign additional tasks based upon the measured activity received from the access monitor.

In another aspect of the present invention, a technique is provided for determining which memory requests should be counted when gathering statistics associated with a session and the assigned processor. The inventive technique is based upon memory regions. For a memory request to be considered for measuring the activity of the session, it must occur within a specified range (e.g., a sub-block) of memory addresses associated with that session. For this purpose a data structure is configured to keep track of activity in the memory region containing the sub-blocks including multiple memory cycles within a given sub-block. Over a period of time, active tasks may be "aged out" by more recent active tasks and the statistics associated with the more recent tasks are recorded and forwarded to the central load balancer. The memory region containing the sub-blocks is limited and "aged out" refers to more recent active sessions replacing earlier active sessions in that limited memory.

Advantageously, the present invention dynamically measures activity associated with a processor resource without impacting performance since the dynamic measuring does not consume bandwidth on the memory interfaces, as do existing solutions. The inventive technique also offloads the gathering of status information from the central load balancer to the access monitor. In the illustrative embodiment, the access monitor is embodied as a "hardware assist" device that cooperates with the load balancing algorithm executing on an intermediate network node, which may comprise a switch or router.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 3 is a schematic block diagram of a processor resource having a processor and memory coupled to an access monitor of the present invention;

FIG. 4 is a diagram showing the address space organization of the memory associated with the processor of the processor resource; and FIG. 5 is a schematic block diagram of the access monitor arranged in accordance with the present invention.

DETAILED DESCRIPTION OF AN ILLUSTRATIVE EMBODIMENT

Figure 1:
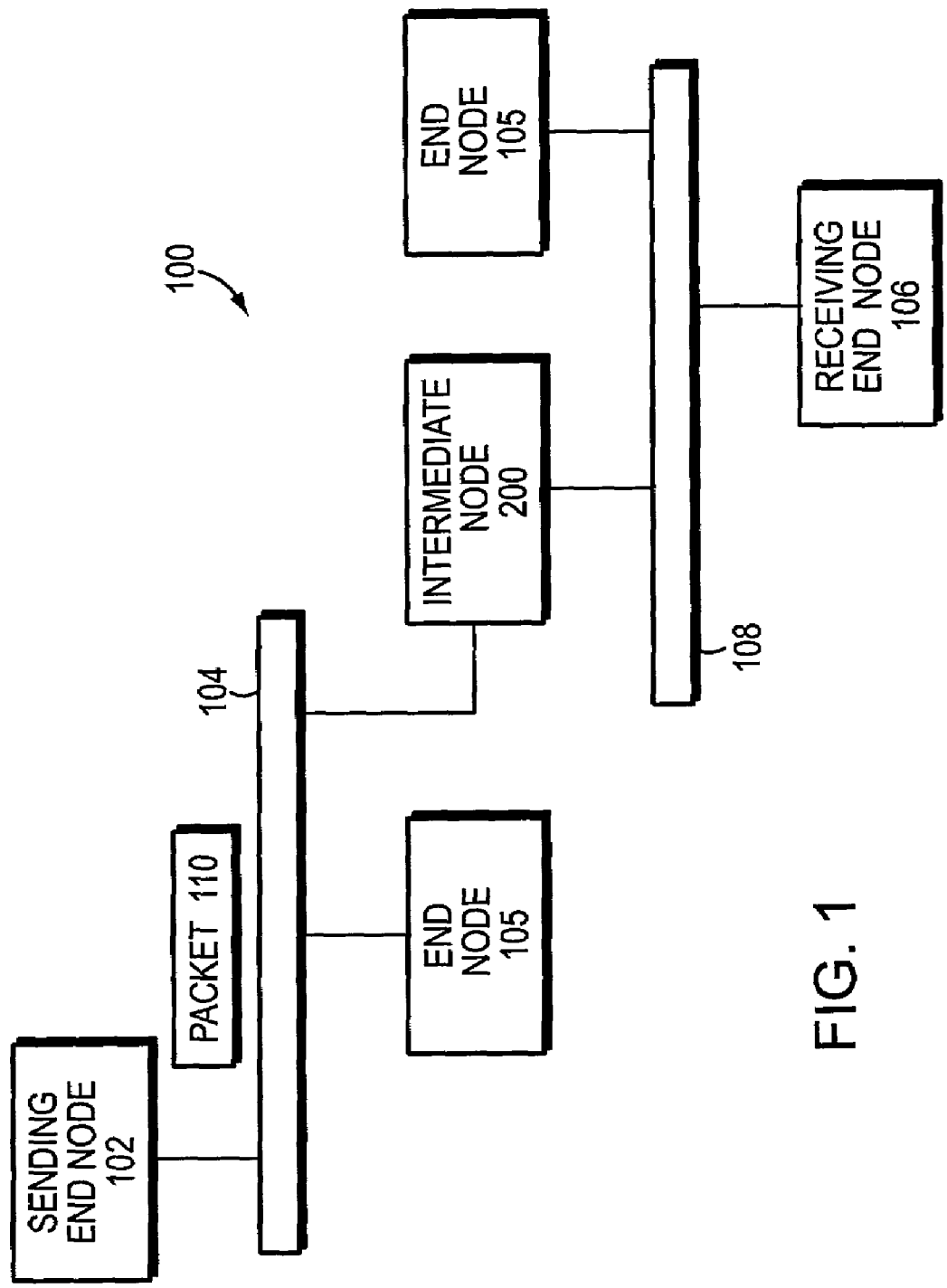
FIG. 1 is a block diagram of a computer network comprising a collection of interconnected sub-networks and nodes, including an intermediate network node.

FIG. 1 diagrams a computer network 100 comprising a collection of interconnected sub-networks and nodes. The nodes may comprise computers including end nodes 105, a sending end node 102, a receiving end node 106, and an intermediate network node 200, the latter of which may be a switch or router. The sub-networks 104, 108 included within network 100 are preferably local area networks (LANs) interconnected by the intermediate node 200, although the networks may comprise other communication links, such as wide area networks. Communication among the nodes coupled to the LANs is typically effected by exchanging discrete packets 110 among the nodes. Such physical computers, peripherals, transmission devices, protocols, data structures, operating software and other software systems and the like are well known to those skilled in the art.

Figure 2:
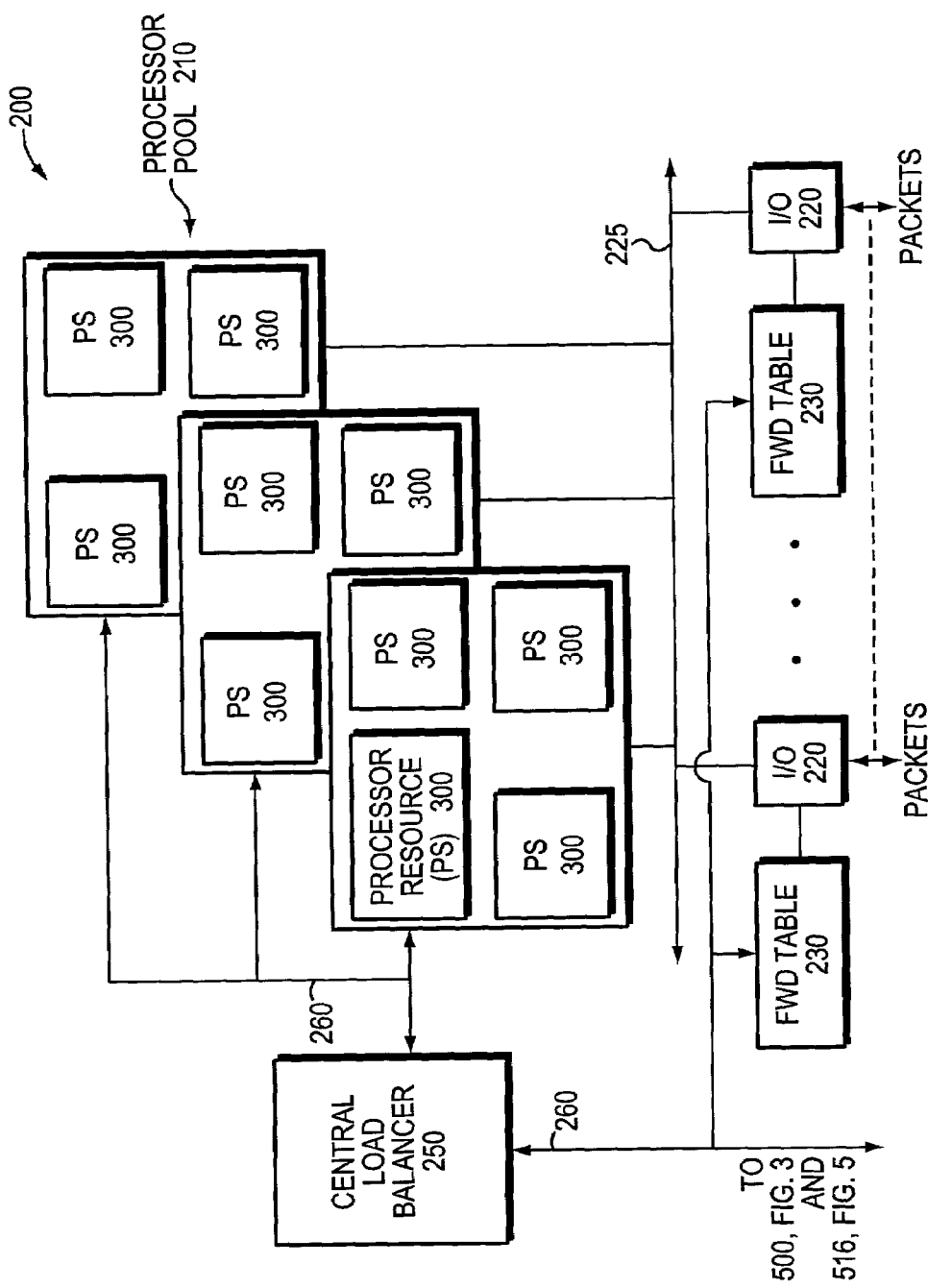
FIG. 2 is a schematic block diagram illustrating an intermediate network node having a plurality of processor resources that may be advantageously used with the present invention.

FIG. 2 is a schematic block diagram illustrating an intermediate network node 200, such as a switch or router, which may be advantageously used with the present invention. The intermediate network node 200 comprises a multiprocessor environment of processor resources (PS) 300 organized as a "processor pool 210" coupled to at least one input/output (I/O) interface 220 via a system bus 225. The multiprocessor environment described herein maintains state information pertaining to hundreds of thousands of user sessions. The processor pool 210 provides the scalability needed to handle such substantial quantity of activity.

The node 200 further comprises a central load balancer 250 coupled to the processor resources 300 of the pool 210 and also coupled to a forwarding table 230 associated with each I/O interface 220. The central load balancer 250 preferably comprises a general-purpose processor configured to execute a predetermined load balancing algorithm used to distribute packets received at the I/O interface among the processor resources of the pool. The packets are associated with sessions that are created between users for purposes for exchanging information associated, for example, with voice data types. To that end, the intermediate network node 200 may be used in a mobile, wireless traffic data application associated with a wireless computer network.

A unique identifier associated with an incoming packet/session is used to access the forwarding table 230. The unique identifier is used to index into the table 230 to lookup and retrieve forwarding decision information needed to direct the packet to the appropriate processor resource 300 for subsequent processing. The forwarding table 230 contains information about all active user sessions within the intermediate network node. The forwarding table is also used to direct an incoming packet to the appropriate processor resource where the session state information is maintained.

FIG. 3 is a schematic block diagram of a processor resource 300 within the processor pool 210. Each resource 300 preferably comprises a processor 302 coupled to a memory 400 via a memory bus or interface 310. The memory 400 comprises storage locations addressable by the processor for storing software programs and data structures associated with the invention described herein. An operating system, portions of which are typically resident in memory and executed by the processors, functionally organizes the intermediate node by, inter alia, invoking network operations in support of software processes executing on the node. It will be apparent to those skilled in the art that other memory means, including various computer readable media, may be used for storing and executing program instructions pertaining to the described mechanism and technique.

The memory interface 310 comprises a plurality of wires or "lines," including memory address, data and control lines. As noted, the present invention provides a technique that efficiently monitors the physical signals on the interface 310 to determine the active/inactive status of sessions distributed among the processor resources. Compare this inventive technique to prior approaches where a software-based pooling algorithm gathers and monitors statistics pertaining to the dynamic activity of sessions distributed to each processor of a multiprocessor environment. In contrast, the present invention provides an access monitor circuit 500 coupled to the memory interface 310 that monitors ("snoops") predetermined memory addresses and control lines of the memory 400 without using any memory cycles.

In accordance with the invention, the access monitor 500 is configured to monitor the activity (e.g., memory access requests) over the memory interface and directed to certain regions of the memory 400. These certain regions are configured to maintain status information associated with sessions stored in the memory. By monitoring the activity associated with a particular session, the access monitor 500 may gather status information, such as statistics, and provide that information to the central load balancer "out-of-band", i.e., via control lines 260 (FIG. 2) exclusive of the node's system bus 225. Advantageously, the access monitor 500 offloads the responsibility for gathering statistics information from each processor 302, thereby removing the processor and its resources from that overhead function. Thus, the access monitor 500 operates as a "hardware-assist" load balancing function that cooperates with software executing on the processor and central load balancer 250.

FIG. 4 is a diagram showing the address space organization of the memory 400 associated with each processor 302 of a processor resource 300. The address space of the memory is apportioned into various regions, one of which is a region 410 configured to store sessions. This "session" region 410 is further divided into various blocks 420, each of which is configured to store a session. The processor 302 may access a number of locations within a particular session block 420 in order to update various fields with state information associated with a session.

According to the invention, the access monitor 500 monitors memory control lines and predetermined high-order memory address lines that map to the session region 410 and, in particular, to a specific block 420 within the session region to determine the activity associated with that session. In an alternate embodiment, the access monitor 500 may be configured to monitor additional memory address lines to thereby determine the activity associated with a particular field 422 within each session block or record 420. In this embodiment, whenever the field 422 within the record 420 is accessed, the access monitor "counts" that access as an activity corresponding to the session.

FIG. 5 is a schematic block diagram of the novel access monitor 500 in accordance with the present invention. The access monitor 500 is described herein as a plurality of external logic circuits; however, it will be understood to those skilled in the art that the access monitor function may be further embodied as an application specific integrated circuit. The access monitor comprises memory interface logic 502 coupled to the memory interface 310 and to address decode logic 508. The memory interface logic 502 provides a physical interface to the memory interface "bus" including buffers and transceivers that receive and output information over the bus. The logic 502 also provides address lines 504 and control lines 506 to the address decode logic 508. The address decode logic 508 is configured with conventional circuitry adapted to decode the information presented over the lines 504, 506 in order to determine the operations performed by the processor 302 for a specific session. For example, the control lines 504 may specify either a read or write operation to a specific session block/record 420 identified by the address lines 506.

The access monitor 500 further includes session update logic 512 coupled to the address decode logic 508 by way of decoded address/control lines 510. The session update logic comprises conventional circuitry adapted to map the decoded addresses and their associated activities presented over lines 510 to a data structure organized to retain that status information. The data structure is preferably an active session table 520 having a plurality of entries 522, each of which is associated with a corresponding session and configured to store status information, such as statistics, pertaining to activities associated with that session. The monitor also includes central load balancer interface logic 516 coupled to the session update logic 512 via line 514. The interface logic 516 provides a physical interface to the central load balancer over control lines 260 and, as such, includes buffers and transceiver circuitry to receive and output information over those lines. The interface logic 516 is further configured to provide status information to the central load balancer 250, which information is used to determine the distribution of loads among the processor resources 300 when executing a particular load-balancing algorithm.

In the illustrative embodiment of the present invention, the address decode logic 508 decodes addresses and control on the address lines 504 and control lines 506 to determine whether the access request from the processor 302 falls within the session region 410 of the memory address space. If so, the address decode logic 508 further decodes the address information to identify a specific session block/record 420 associated with the processor request. The address decode logic 508 then instructs the session update logic 512 to (i) determine whether a session entry 522 exists for the particular decoded session and, if not, (ii) create an entry for the session in the active session table 520. Another data structure, such as a buffer ring 524, may be maintained within the entry 522 to keep track of the multiple memory cycles associated with a specific session.

Over a period of time, certain active entries 522 may be "aged out" of the table 510 to allow insertion of more recent active sessions within those entries. The active session table 520 keeps track of the activity of sessions within the session region 410 of memory 400 during that time period. Upon being presented a decoded address over line 510 from the address decode logic 508, the session update logic 512 (i) updates the appropriate entry 522 (if it exists) by, e.g., incrementing status information contained within the entry or (ii) creates a new entry of the table 520. Specifically, the session update logic 512 compares that address with the address of a session stored within each entry 522 of the active session table 520. If there is not a match, the session update logic 512 allocates an entry by executing an aging algorithm to remove an existing entry from the table 520 and insert the current session identified by the decoded address into that entry. The aging algorithm may be based on, e.g., a count of the number of accesses made by a processor 302 to the session block/record 420 associated with the entry.

In the illustrative embodiment, the status information stored within each entry of the active session table represents activity (accesses) to the session associated with that entry within a particular time interval. During a predefined interval, each access by a processor 302 to a particular session block 420 is recorded within the active session table 520 as an increment to the status information stored within the associated entry 522. The active session table 520 thus keeps track of which sessions had a "hit" during the interval of time, thereby indicating an active session. At the end of the time interval, there may be a plurality of active sessions recorded for a particular processor. The session update logic 512 may then report the number of entries (active sessions) that were allocated during that time interval. That is, the session update logic 512 may provide a count of active sessions over line 514 to the central load balancer interface logic 516. At the end of the time interval, the session update logic 512 "clears" each entry 522 of the table 520 and begins recording new active sessions during the subsequent time interval. Therefore, the central load balancer interface logic 516 provides to the central load balancer 250 a count as to the number of active sessions its associated processor 302 processed during the previous time interval. The central load balancer 250 may then use that information when determining its load balancing distribution.

Specifically, the central load balancer 250 analyzes the status information provided by each access monitor 500 of a processor resource 300 to determine the actual load executed by the resource during a specified period of time. For example, the central load balancer may overlay the number of active sessions per processor onto the total number of sessions assigned per processor to determine the type of activity versus inactivity (quiescence) across the pool of resources. Moreover by accessing different locations within an entry of the active session table 520, different forms of statistics may be collected. For example, if a particular field 526 of an entry 522 is associated with creation of a session, that field 526 can be monitored to count the number of times that session was created and/or destroyed within a predefined interval. It will be understood to those skilled in the art that various forms of status information may advantageously be gathered in accordance with the principles of the present invention. The types of statistics that may be collected include the number of active sessions during a predetermined time interval, the number of "hits" (accesses) to a particular session block during a time interval and the number of creations/destroys of sessions during that interval.

As noted, the memory associated with each processor is apportioned into various regions, one of which is the session region 410 comprising a plurality of session blocks or records 420. Each session record comprises a fixed format or a fixed size block such that it can be determined from the address which particular session has been accessed by a processor request. Since the format of the record is known and fixed, each access to a particular field of the record may represent an activity that can be recorded/counted when determining an active status of the session.

For example, in an alternate preferred embodiment of the invention, each field 422 of the record 420 is software configurable (given the static nature of the record format) such that a particular field may be programmed to reflect activity used to determine balancing of sessions across the pool of processors. The hardware assist device 500 cooperates with the software executing on the processor 302 so that it "knows" the manner in which the software constructed the record 420 such that it is unambiguous as to the type of information the hardware assist device (access monitor) is monitoring. The present invention thus provides a hardware-assist device that gathers statistics pertaining to the active and inactive status of sessions processed by a processor of a processor pool and is provides that information to a central load balancer without consuming bandwidth over the system data path.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A load balancing system for distributing tasks to a processor resource of a processor pool, the system comprising:
   a memory with a region organized into at least one memory block, each memory block configured to store a session;
   an interface for coupling the memory to the processor resource, whereby the processor resource accesses the at least one memory block to update information associated with the session;
   an access monitor coupled to the interface, wherein the access monitor passively recognizes and tracks memory cycles by snooping memory address and control lines associated with the at least one memory block during a specified period of time and collects statistics associated with the session; and a central resource coupled to the access monitor, the central resource arranged to receive the statistics from the access monitor, and, in response thereto, to assign tasks to the processor resource.

2. The load balancing system as defined in claim 1 further comprising logic for recognizing a new session and designating a memory block for that session.

3. The load balancing system as defined in claim 1 wherein the access monitor comprises:
   memory address logic that recognizes address fields defining the at least one memory block;
   memory control logic that recognizes memory cycles being executed on the at least one memory block; and
   a session table with activity information entries associated with each session.

4. The load balancing system as defined in claim 1 wherein the access monitor is embodied as an application specific integrated circuit.

5. The load balancing system as defined in claim 3 wherein, when the specified period of time elapses, the session table is cleared.

6. A load balancing system for distributing tasks to a processor resource of a processor pool, the system comprising:
   means for storing information into at least one block, each block configured to store a session;
   means for coupling the at least one block to the processor resource, whereby the processor resource access the at least one memory block to update information associated with the session;
   means for monitoring information transfers on the interface, wherein the means for monitoring passively recognizes and tracks memory cycles by snooping memory address and control lines associated with the at least one memory block during a specified period of time and collects statistics associated with the session; and
   means for assigning tasks coupled to the means for monitoring to receive the statistics therefrom, and in response thereto, to assign tasks to the processor resource.

7. The load balancing system as defined in claim 6 further comprising means for recognizing a new session and designating a memory block for that session.

8. The load balancing system as defined in claim 6 wherein the means for monitoring information further comprises:
   means for recognizing memory address fields defining the at least one memory block;
   means for recognizing memory cycles being executed on the at least one memory block; and
   means for storing activity information entries associated with each session.

9. The load balancing system as defined in claim 8 wherein, when the specified period of time elapses, the session table is cleared.

10. A load balancing method for distributing tasks to a processor resource of a processor pool, the method comprising the steps of:
    storing information into memory with a region organized into at least one memory block, each memory block configured to store a session;
    coupling the memory to the processor resource, whereby the processor resource accesses the at least one memory block to update information associated with the session;
    passively monitoring information transfers between the at least one memory block and the processor resource, wherein the step of monitoring further comprises recognizing and tracking memory cycles by snooping memory address and control lines associated with the at least one memory block during a specified period of time and collecting statistics associated with the session; and
    receiving the statistics, and, in response thereto, assigning tasks to the processor resource.

11. The load balancing method as defined in claim 10 further comprising the steps of recognizing a new session and designating a memory block for that session.

12. The load balancing method as defined in claim 10 wherein the step of monitoring information transfers comprises the steps of:
    recognizing memory address fields defining the at least one memory block;
    recognizing memory cycles being executed on the at least one memory block; and
    storing activity information entries associated with each session in a session table.

13. The load balancing method as defined in claim 12 wherein, when the time period has elapsed, the session table is cleared.

14. Computer readable memory comprising computer executable program instructions for load balancing distribution of tasks to a processor resource of a processor pool, the instructions, when executed, causes:
    storing information into memory with a region organized into at least one memory block, each memory block configured to store a session,
    coupling the memory to the processor resource, whereby the processor resource accesses the at least one memory block to update information associated with the session,
    passively monitoring information transfers between the at least one memory block and the processor resource, wherein the monitoring recognizes and tracks memory by snooping memory address and control lines associated with the at least one memory block during a specified period of time and collects statistics associated with the session; and
    receiving the statistics, and, in response thereto, assigning tasks to the processor resource.

15. Computer readable memory as defined in claim 14, the computer program when executed also causes recognizing of a new session and designating a memory block for that session.

16. Computer readable memory as defined in claim 14, the computer program when executed also causes:
    recognizing memory address fields defining the at least one memory block;
    recognizing memory cycles being executed on the at least one memory block; and
    storing activity information entries associated with each session in a session table.

17. Computer readable memory as defined in claim 16, the computer program when executed also causes, when the time period has elapsed, the session table to be cleared.

18. A load balancing system for distributing tasks to a plurality of processors of a processor pool, the system comprising:
    a plurality of memories, each memory associated with a processor of the plurality of processors, each memory organized into a plurality of memory blocks, each memory block configured to store a session;

a plurality of interfaces, each interface coupling one of the memories to one of the processors, whereby the processors accesses memory blocks over the interfaces to update information associated with the sessions;

an access monitor coupled to the interfaces, wherein the access monitor passively recognizes accesses to the memory blocks by snooping memory address and control lines to thereby collects statistics associated with the sessions; and a central resource coupled to the access monitor, the central resource arranged to receive the statistics from the access monitor, and, in response thereto, to assign tasks to the processors.

19. A load balancing method for distributing tasks a plurality of processors of a processor pool, the method comprising:

storing information related to sessions into a plurality of memories, each memory arranged into a plurality of memory blocks, each memory block associated with a session;

coupling the memories to the processors with a plurality of interfaces, each interface interconnecting a processor to a memory associated with the processor;

passively monitoring information transferred over the plurality of interfaces, wherein the step of monitoring further includes recognizing memory accesses associated with memory blocks by snooping memory address and control lines to thereby collect statistics associated with the sessions; and receiving the statistics, and, in response thereto, assigning tasks to the processors.

20. A load balancing system for distributing tasks a plurality of processors of a processor pool, the system comprising:

means for storing information related to sessions into a plurality of blocks, each block associated with a session;

means for coupling the blocks to the processors, each means for coupling interconnecting a processor to a one or more blocks associated with the processor;

means for passively monitoring information transferred over the means for coupling, the means for monitoring recognizing block accesses by snooping memory address and control lines associated with blocks to thereby collect statistics associated with the sessions; and means for receiving the statistics, and, in response thereto, assigning tasks to the processors.

* * * * *